(12) United States Patent
Cho (10) Patent No.: US 10,189,465 B2
(45) Date of Patent: Jan. 29, 2019

(54) CONTROL METHOD FOR HYBRID VEHICLE

(71) Applicant: Hyundai Motor Company, Seoul (KR)

(72) Inventor: Jin Kuk Cho, Goyang-si (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 15/364,146

(22) Filed: Nov. 29, 2016

(65) Prior Publication Data

US 2018/0056975 A1 Mar. 1, 2018

(30) Foreign Application Priority Data

Sep. 1, 2016 (KR) .................. 10-2016-0112842

(51) Int. Cl.
*B60W 10/06* (2006.01)
*B60W 10/08* (2006.01)
(Continued)

(52) U.S. Cl.
CPC ............ *B60W 20/13* (2016.01); *B60K 6/445* (2013.01); *B60W 10/06* (2013.01); *B60W 10/08* (2013.01); *B60W 10/105* (2013.01); *B60W 10/196* (2013.01); *B60W 2510/0638* (2013.01); *B60W 2510/083* (2013.01); (Continued)

(58) Field of Classification Search
CPC .... B60W 10/06; B60W 10/08; B60W 10/105; B60W 10/196; B60W 20/13; B60W 2510/0638; B60W 2510/083; B60W 2510/1005; B60W 2510/244; B60W 2520/10; B60W 2540/10; B60W 2540/12; B60W 2710/0644; B60W 2710/0666; B60W 2710/083; B60W 2710/1005
See application file for complete search history.

(56) References Cited

U.S. PATENT DOCUMENTS 8,626,370 B2 1/2014 Ebuchi et al.
9,180,875 B2 * 11/2015 Choi .................. B60K 6/365
(Continued)

FOREIGN PATENT DOCUMENTS

JP 2006-306343 A 11/2006
JP 2007-118716 A 5/2007
(Continued)

*Primary Examiner* — David R Morris
(74) *Attorney, Agent, or Firm* — Morgan, Lewis & Bockius LLP (57) ABSTRACT

A control method for a vehicle may include shifting request check step of checking whether there is request for shifting in vehicle on the basis of acceleration pedal depression extent and vehicle speed by shifting control device; target engine speed determination step of determining engine target speed on basis of the vehicle speed and gear ratio of pseudo target gear stage by target engine speed determiner when request for shifting is found to have been received as the result of the shifting request check step; and engine speed control step of controlling the engine speed to follow the target engine speed by determining the engine speed control torque on the basis of the difference between the target engine speed and the current engine speed and by applying the determined engine speed control torque to the first motor generator, after the engine target speed determination step.

8 Claims, 4 Drawing Sheets

(51) Int. Cl.
    *B60W 10/105*     (2012.01)
    *B60W 10/196*     (2012.01)
    *B60W 20/13*      (2016.01)
    *B60K 6/445*      (2007.10)

(52) U.S. Cl.
    CPC ............... *B60W 2510/1005* (2013.01); *B60W 2510/244* (2013.01); *B60W 2520/10* (2013.01); *B60W 2540/10* (2013.01); *B60W 2540/12* (2013.01); *B60W 2710/0644* (2013.01); *B60W 2710/0666* (2013.01); *B60W 2710/083* (2013.01); *B60W 2710/1005* (2013.01)

(56) References Cited

U.S. PATENT DOCUMENTS

| | | | |
|---|---|---|---|
| 2010/0274427 A1 | 10/2010 | Ebuchi et al. | |
| 2014/0046517 A1* | 2/2014 | Heap ................... | B60W 10/06 701/22 |
| 2015/0099605 A1* | 4/2015 | Choi .................... | B60K 6/365 477/5 |
| 2017/0225676 A1* | 8/2017 | Atarashi ............ | B60W 20/30 |

FOREIGN PATENT DOCUMENTS

| | | |
|---|---|---|
| JP | 2009-190572 A | 8/2009 |
| JP | 2012127448 | 7/2012 |
| JP | 2014088907 | 5/2014 |
| JP | 2016-101852 A | 6/2016 |
| KR | 10-1500245 | 3/2015 |
| KR | 10-1509706 B1 | 4/2015 |

* cited by examiner

CONTROL METHOD FOR HYBRID VEHICLE

CROSS REFERENCE TO RELATED APPLICATION

The present application claims priority to Korean Patent Application No. 10-2016-0112842, filed Sep. 1, 2016, the entire contents of which is incorporated herein for all purposes by this reference.

BACKGROUND OF THE INVENTION

Field of the Invention

The present invention relates to a control method for a hybrid vehicle, the method improving driving comfort by setting pseudo gear stages in a hybrid vehicle having shift ratios that are continuously changed.

Description of Related Art

A transmission for a hybrid vehicle in the related art provides a power-split-parallel system including: an input shaft that is connected to the output side of an engine; first and second motors/generators that have the functions of a motor and a generator and are disposed in a transmission housing; a planetary gear set that is disposed on the input shaft and includes three rotary elements, of which a first rotary element is directly connected to the first motor/generator and selectively connected to the input shaft and the transmission housing, a second rotary element is directly connected to the input shaft, and a third rotary element is connected to an output gear and the second motor/generator; and a connecting member that is disposed on the selective connecting portions.

In a power-split mode, the ratio of the rotation speed of an engine to the vehicle speed can be infinitely changed, whereby driving comfort that is the same as that provided by a Continuously Variable Transmission (CVT) is provided. However, a user that is not familiar with the characteristics of a CVT feels uncomfortable while driving, which deteriorates the perceived quality of the vehicle.

Accordingly, the present invention intends to provide a control method providing multiple pseudo gear ratios in a power-split system and a power-split-parallel system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method for a hybrid vehicle that improves the driving comfort of a vehicle through virtual shifting by changing the torque from first and second motor generators and an engine speed in accordance with the driving situation of an EVT hybrid vehicle, in which the shift ratio is continuously changed.

In an aspect of the present invention, there is provided a control method for a hybrid vehicle, in which an engine and first and second motor generators are connected to a planetary gear set to continuously change a gear ratio, the method including: a shifting request check step of checking whether there is a request for shifting in a vehicle based on an acceleration pedal depression extent and a vehicle speed by a shifting control device; a target engine speed determination step of determining an engine target speed based on the vehicle speed and a gear ratio of a pseudo target gear stage by a target engine speed determiner when a request for shifting is found to have been received as the result of the shifting request check step; and an engine speed control step of controlling the engine speed to follow the target engine speed by determining an engine speed control torque based on a difference between the target engine speed and a current engine speed and by applying the determined engine speed control torque to the first motor generator, after the engine target speed determination step, in which the pseudo target gear stage is achieved by changing torque from the first and second motor generators after the engine speed control step.

The method may further include: a required torque determination step of determining driver-requested torque based on an acceleration pedal depression extent and a brake pedal depression extent by a driver-requested torque determiner in the shifting request check step; an engine torque determination step of determining a target engine torque based on a target engine speed and a high-voltage battery SOC by an engine operation point determiner after the target engine speed determination step; and an engine torque control step of operating an engine with the target engine torque determined by the engine operation point determiner after the engine torque determination step, in which the engine speed control step is performed after the engine torque control step.

The method may further include: a first torque determination step of determining a reaction torque of the first motor generator based on the target engine torque by a first torque determiner after the engine torque determination step; and a first torque control step of operating the first motor generator with the determined reaction torque of the first motor generator after the first torque determination step.

The method may further include: a second torque determination step of determining a driving torque of the second motor generator based on the driver-requested torque and of determining reaction torque of the second motor generator based on the target engine torque and the engine speed control torque by a second torque determiner after the engine torque determination step; and a second torque control step of operating the second motor generator with the sum of the determined driving torque and the reaction torque of the second motor generator.

The method may further include a torque intervention determination step of determining a torque intervention value reducing the torque of the second motor generator by a predetermined rate at a shifting time point by a torque intervention control device when shifting is required after the result of performing the shifting request check step, in which, in the second torque determination step, the second torque determiner determines the driving torque of the second motor generator by summing up the driver-requested torque and the torque intervention value.

The method may further include an overdrive control step of operating a brake connected to the first motor generator by an overdrive control device when an absolute value of a rotation speed of the first motor generator is less than a predetermined speed after the engine torque control step.

The method may further include a third torque determination step of determining a driving torque for the second motor generator based on the driver-requested torque by a second torque determiner after the overdrive control step.

When an absolute value of a rotation speed of the first motor generator is a predetermined speed or more after the engine torque control step, the first torque determination step may be performed.

When an absolute value of a rotation speed of the first motor generator is a predetermined speed or more after the engine torque control step, the second torque determination step may be performed.

According to the control method for a hybrid vehicle, it is possible to achieve pseudo multistage gear ratios even in a hybrid vehicle in which a shift ratio is continuously changed, so it is possible to provide satisfactory driving comfort for a driver who is familiar with a multistage transmission.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a control method for a hybrid vehicle according to an exemplary embodiment of the present invention will be described with reference to the accompanying drawings.

Figure 1:
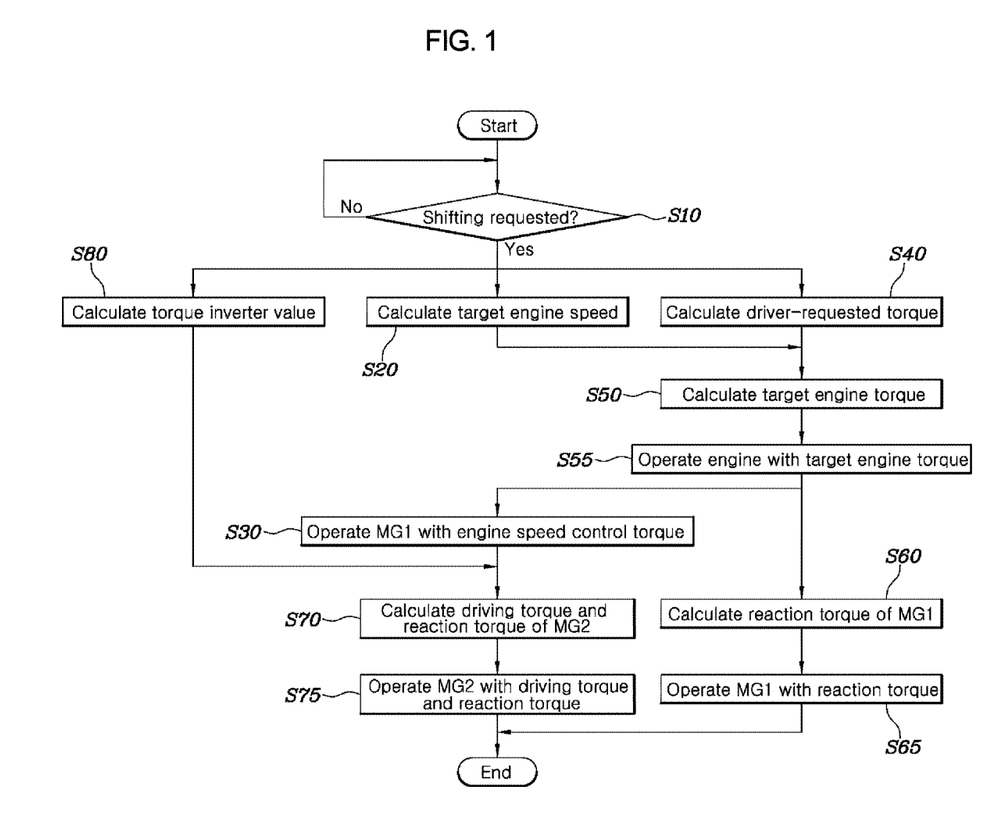
FIG. 1 is a flowchart showing a control method for a hybrid vehicle including a power-split system according to an exemplary embodiment of the present invention.

FIG. 1 is a flowchart showing a control method for a hybrid vehicle according to an exemplary embodiment of the present invention. Referring to FIG. 1, the control method for a hybrid vehicle, in which an engine and first and second motor generators are connected to a planetary gear set to continuously change a shift ratio, include: a shifting request check step (S10) of checking whether there is a request for shifting in a vehicle on the basis of an acceleration pedal depression extent and a vehicle speed by a shifting control device; a target engine speed determination step (S20) of determining a target engine speed on the basis of a vehicle speed and the gear ratio of a pseudo target gear stage by a target engine speed determiner when there is a request for shifting as the result of the shifting request check step (S10); and an engine speed control step (S30) of controlling the engine speed to follow the target engine speed by determining engine speed control torque on the basis of the difference between the target engine speed and the current engine speed and applying the determined engine speed control torque to the first motor generator, after the target engine speed determination step (S20), in which the pseudo target gear stage is achieved by changing torque from the first and second motor generator after the engine speed control step (S30).

In a hybrid vehicle with an Electric Variable Transmission (EVT) in which a shift ratio is continuously changed, the system efficiency was the most important in the related art, so controlling the rotation speed of an engine at the optimal efficient point regardless of the vehicle speed has been performed.

However, according to an exemplary embodiment of the present invention, gear stages having different shift ratios are virtually divided from gear ratios that can be obtained in a hybrid vehicle in which a shift ratio is continuously changed, and the engine speed is changed in accordance with a pseudo gear stage corresponding to the current vehicle speed and the acceleration pedal depression extent so that multistage shifting is performed.

Accordingly, it is possible to provide satisfactory shifting and driving comfort for a driver who is not familiar with an EVT system, but to multistage shifting, so the commercial value of a vehicle can be maximized.

The shifting control device checks the minimum gear ratio and the maximum gear ratio, which can be achieved in a hybrid vehicle, and divides the difference between the minimum gear ratio and the maximum gear ratio in consideration of the design specifications and the vehicle, whereby gear ratios can be set for pseudo gear stages. For example, when the gear ratio obtained by subtracting a final reduction gear ratio from a gear ratio that can be achieved in a vehicle is 5, this gear ratio is the maximum gear ratio. Further, assuming that the maximum gear ratio is 0.7, the range between 0.7 and 5 is divided into six gear ratios. That is, the first, second, third, fourth, fifth, and sixth stage gear ratios may be differently set to 5, 3, 2, 1.5, 1, and 0.7, respectively.

As described above, when gear ratios corresponding to pseudo gear stages are set, a shifting pattern map is made, so that it is determined which one of up-shift and down-shift is to be performed in accordance with the vehicle speed and the acceleration pedal depression extent and it is possible to determine a target gear stage and a shifting time point, whereby it is possible to perform shifting that corresponds to the driving situation.

When the shifting control device determines that shifting is required, the target engine speed determiner receives signals for the shifting time point and the target gear stage from the shifting control device.

The target engine speed determiner determines a target engine speed for improving shifting responsiveness on the basis of the vehicle speed and the gear ratio corresponding to the received target gear stage, and in detail, the target engine speed is determined from the following expression.

$$N_{eng}=N_{wheel}*\gamma_{FGR}*\gamma_{PGR}$$

where $N_{eng}$ is a target engine speed, $N_{wheel}$ is the rotation speed of the current driving wheels, $\gamma_{FGR}$ is a final reduction gear ratio (FGR), and $\gamma_{PGR}$ is the gear ratio (pseudo gear ratio: PGR) of a virtually set target gear stage. $N_{wheel}$ may be obtained from the vehicle speed.

When the target engine speed is determined, it may be lower than idle rpm at a low vehicle speed. In the instant case, the target engine speed determiner can maintain the operating state of the engine by setting the target engine speed to 0 rpm or idle rpm. When the target engine speed is set to 0 rpm, the fuel efficiency of the vehicle is improved, and when the target engine speed is set to idle rpm, the driving responsiveness of the vehicle is improved.

Meanwhile, the engine speed control device controls the speed of the engine through the first motor generator and includes performing feedback control so that the engine speed follows the target engine speed by recognizing the difference between the current engine speed and the target engine speed as an error. A disturbance observer may be added to more accurately control the speed.

Further, the method of the present invention further includes: a required torque determination step (S40) of determining driver-requested torque on the basis of an acceleration pedal depression extent and a brake pedal depression extent by a driver-requested torque determiner in the shifting request check step (S10); an engine torque determination step (S50) of determining target engine torque on the basis of a target engine speed and a high-voltage battery SOC by an engine operation point determiner after the target engine speed determination step (S20); and an engine torque control step (S55) of operating an engine with the target engine torque determined by the engine operation point determiner after the engine torque determination step (S50), in which the engine speed control step (S30) is performed after the engine torque control step (S55).

In detail, the driver-requested torque determiner determines driver-requested torque that is in proportion to the acceleration pedal depression extent and in inverse proportion to the brake pedal depression extent (S40).

The engine operation point determiner determines a target engine torque that does not reduce the high-voltage battery SOC below a predetermined level and satisfies the driver-requested torque and the target engine speed (S50) and operates the engine with the determined target engine torque (S55), whereby it can achieve a rotation speed of the engine that corresponds to a pseudo gear stage of a vehicle.

However, in a hybrid vehicle of the present invention, the rotation elements of the planetary gear set are connected to the engine and the first and second motor generators, so it is possible to obtain the gear ratio of the desired gear stage by applying reaction torque of the torque applied to the engine to the first and second motor generators.

The method of the present invention may further include: a first torque determination step (S60) of determining reaction torque of the first motor generator on the basis of the target engine torque by a first torque determiner after the engine torque determination step (S50); and a first torque control step (S65) of operating the first motor generator with the determined reaction torque of the first motor generator after the first torque determination step (S60).

That is, to distribute the power from the engine to the first motor generator, it is required to perform reaction torque control on the target engine torque through the first motor generator mounted on the sun gear of the planetary gear set. The reaction torque of the first motor generator is determined from the following expression.

$$T_{sun} = -\frac{1}{1+R}T_{carrier}$$

where $T_{sun}$ is the reaction torque of the first motor generator, $T_{carrier}$ is the target engine torque, and R is the number of teeth of the ring gear.

Further, the method may further include: a second torque determination step (S70) of determining driving torque of the second motor generator on the basis of the driver-requested torque and determining reaction torque of the second motor generator on the basis of the target engine torque and the engine speed control torque by a second torque determiner after the engine torque determination step (S50); and a second torque control step (S75) of operating the second motor generator with the sum of the determined driving torque and the reaction torque of the second motor generator.

That is, the second torque determiner determines the driving torque of the second motor generator for satisfying driver-requested torque according to operation by the driver, and determines the reaction torque of the engine speed control torque applied to the engine and the target engine torque applied to the first motor generator and applies the reaction torque to the second motor generator, whereby the rotation speed of the engine can be controlled so that shifting to a pseudo target gear stage can be achieved as requested by the driver.

Meanwhile, a multi-transmission system performs control in which torque of an engine or a driving motor instantaneously drops during shifting. This kind of control is called torque intervention, and is implemented in the present invention.

Accordingly, the method further includes a torque intervention determination step (S80) of determining a torque intervention value reducing the torque of the second motor generator by a predetermined rate at a shifting time point by a torque intervention control device when shifting is required after the result of performing the shifting request check step (S10), and in the second torque determination step (S70), the second torque determiner determines the driving torque of the second motor generator by summing the driver-requested torque and the torque intervention value.

That is, when the torque intervention control device applies the torque intervention value to the second motor generator, torque intervention is performed at the point of time at which shifting is performed at a pseudo target gear stage in the vehicle, so the driver can feel the sensation of shifting using a multistage transmission. Accordingly, it is possible to provide satisfactory driving comfort for drivers who are familiar with vehicles with multistage transmissions.

Figure 2:
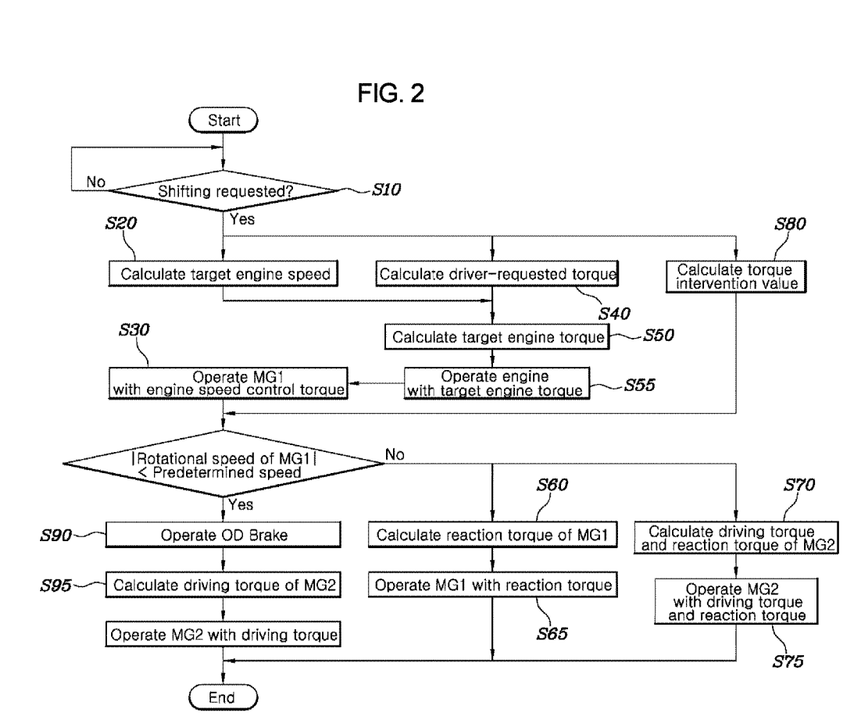
FIG. 2 is a flowchart showing a control method for a hybrid vehicle including a power-split-parallel system to an exemplary embodiment of the present invention.

The method relates to a hybrid vehicle equipped with only a power-split system. When a hybrid vehicle supports a power-split-parallel system, the control method shown in FIG. 2 may be performed. FIG. 2 is a flowchart performed by a controller and showing a control method for a hybrid vehicle supporting a power-split-parallel system according to an exemplary embodiment of the present invention.

Referring to FIG. 2, the method may further include an overdrive control step (S90) of operating the brake connected to the first motor generator by an overdrive control device when the absolute value of the rotation speed of the first motor generator is less than a predetermined speed after the engine torque control step (S55).

That is, when the rotation speed of the first motor generator is maintained around 0 rpm while the vehicle is driven, the rotation speeds of the first motor generator and the sun gear are fixed to 0 rpm by operating the brake, whereby the first motor generator does not output torque any longer. Accordingly, the torque input to the carrier can be increased and output to the ring gear.

Further, the method may further include a third torque determination step (S95) of determining driving torque of the second motor generator on the basis of the driver-requested torque by a second torque determiner after the overdrive control step (S90).

That is, when the brake is locked up, the sun gear and the first motor generator connected to the brake do not output torque any longer. Accordingly, the second torque determiner has to determine the driving torque of the second motor generator on the basis of the driver-requested torque without obtaining the reaction torque of the first motor generator, operating the second motor generator. Accordingly, it is possible to reduce the amount of time taken to execute the control logic.

When the absolute value of the rotation speed of the first motor generator is a predetermined speed or more after the engine torque control step (S55), the first torque determination step (S60) is performed and the second torque determination step 70 can be performed.

That is, when the brake is not locked up, as in the related art, the reaction torque of the first motor generator may be determined and the driving torque and the reaction torque of the second motor generator may be applied to the motor generators to induce smooth shifting control.

Figure 3:
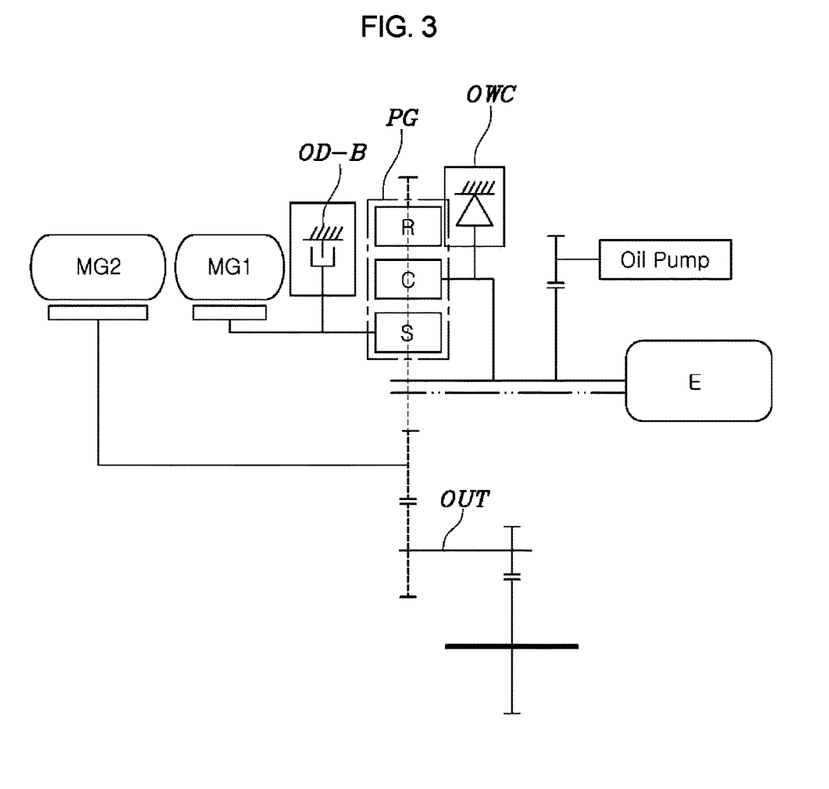
FIG. 3 is a view showing the configuration of a transmission for a hybrid vehicle according to an exemplary embodiment of the present invention.
Figure 4:
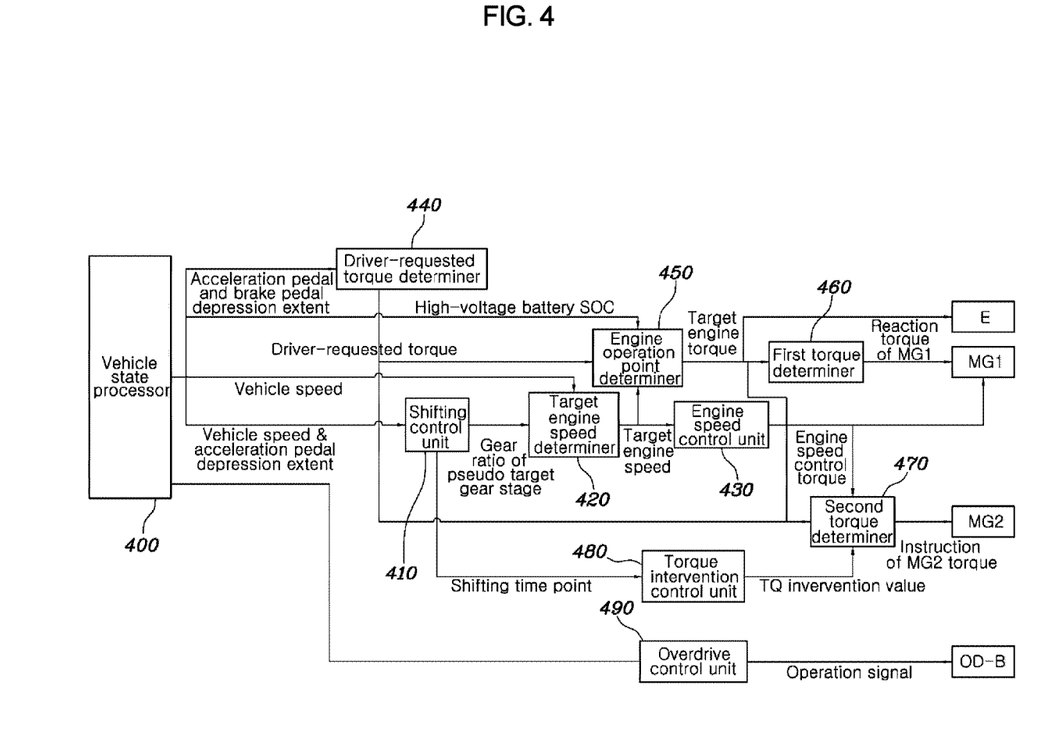
FIG. 4 is a block diagram showing a control system of a hybrid vehicle according to an exemplary embodiment of the present invention.

FIG. 3 is a view showing the configuration of a transmission for a hybrid vehicle according to an exemplary embodiment of the present invention and FIG. 4 is a block diagram showing a control system of a hybrid vehicle according to an exemplary embodiment of the present invention. Referring to FIG. 3 and FIG. 4, the control system for a hybrid vehicle, in which a first motor generator MG1 and a brake OD-B are connected to a sun gear S of a planetary gear set PG, an engine E is connected to a carrier C, and a second motor generator MG2 and an output shaft OUT are connected to a second motor generator MG2 to continuously change a gear ratio, includes: a shifting control device 410 that checks whether shifting is required on the basis of vehicle speed and acceleration pedal depression extent signals from a vehicle state signal processor 400; a target engine speed determiner 420 that determines a target engine speed on the basis of the vehicle speed and the gear ratio of a pseudo target gear stage received from the shifting control device 410; an engine speed control device 430 that controls an engine speed to follow the target engine speed by determining an engine speed control torque on the basis of the difference between the current engine speed and a target engine speed received from the target engine speed determiner 420 and by applying the determined engine speed control torque to the first motor generator MG1; and a controller that makes the pseudo target gear state by changing the torque of the first and second motor generators MG1 and MG2 when the engine speed control device 430 controls the engine speed.

Further, the control system of the present invention may further include: a driver-requested torque determiner 440 that determines driver-requested torque on the basis of an acceleration pedal depression extent and a brake pedal depression extent received from the vehicle state signal processor 400; and an engine operation point determiner 450 that determines target engine torque on the basis of the driver-requested torque received from the driver-requested torque determiner 440, the target engine speed received from the target engine speed determiner 420, and a high-voltage battery SOC received from the vehicle state signal processor 400, and then operates the engine E with the target engine torque.

The controller may include a first torque determiner 460 that determines the reaction torque of the first motor generator MG on the basis of the target engine torque received from the engine operation point determiner 450 and operates the first motor generator MG1 with the determined reaction torque of the first motor generator MG1; and a second torque determiner 470 that determines driving torque of the second motor generator on the basis of the driver-requested torque received from the driver-requested torque determiner 440, determines reaction torque of the second motor generator MG2 on the basis of the target engine torque received from the engine operation point determiner 450 and the engine speed control torque received from the engine speed control device 430, and operates the second motor generator with the sum of the driving torque and the reaction torque of the second motor generator MG2.

The control system may further include a torque intervention control device 480 that determines a torque intervention value that reduces the torque of the second motor generator MG2 by a predetermined rate at a shifting time point received from the shifting control device 410, and the second torque determiner 470 receives a torque intervention value from the torque intervention control device 480 and determines driving torque of the second motor generator MG2 by summing the torque intervention value and the driver-requested torque.

The control system may further include an overdrive control device 490 that compares the absolute value of the rotation speed of the first motor generator MG1 with a predetermined speed and then operates the brake when the absolute value is less than the predetermined speed.

In the instant case, the controller includes the second torque determiner 470, which determines the driving torque of the second motor generator on the basis of the driver-requested torque received from the driver-requested torque determiner 440 and operates the second motor generator with the determined driving torque of the second motor generator.

Alternatively, the first torque determiner 460 may determine the reaction torque of the first motor generator MG1 when the absolute value of the rotation speed of the first motor generator MG1 is over the predetermined speed and the second torque determiner 470 may determine the driving torque and the reaction torque of the second motor generator MG2 when the absolute value of the rotation speed of the first motor generator MG1 is over the predetermined speed.

According to the control method and system for a hybrid vehicle, it is possible to achieve pseudo multistage gear ratios even in a hybrid vehicle in which a shift ratio is continuously changed, so it is possible to provide satisfactory driving comfort for a driver who is familiar with a multistage transmission.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a vehicle, in which an engine and first and second motor generators are connected to a planetary gear set to continuously change a gear ratio, the method comprising:
   a shifting request check step of checking whether there is a request for shifting in the vehicle based on an acceleration pedal depression extent and a vehicle speed by a shifting control device;
   a target engine speed determination step of determining a target engine speed based on the vehicle speed and a gear ratio of a pseudo target gear stage by a target engine speed determiner when the request for shifting is found to have been received as a result of the shifting request check step; and
   an engine speed control step of controlling an engine speed to follow the target engine speed by determining an engine speed control torque based on a difference between the target engine speed and a current engine speed and by applying the determined engine speed control torque to the first motor generator, after the target engine speed determination step,
   wherein the pseudo target gear stage is achieved by changing torque from the first and second motor generators after the engine speed control step;
   a required torque determination step of determining driver-requested torque based on the acceleration pedal depression extent and a brake pedal depression extent by a driver-requested torque determiner in the shifting request check step;
   an engine torque determination step of determining a target engine torque based on the target engine speed and a high-voltage battery SOC by an engine operation point determiner after the target engine speed determination step; and
   an engine torque control step of operating the engine with the target engine torque determined by the engine operation point determiner after the engine torque determination step,
   wherein the engine speed control step is performed after the engine torque control step.

2. The method of claim 1, further including:
   a first torque determination step of determining a reaction torque of the first motor generator based on the target engine torque by a first torque determiner after the engine torque determination step; and
   a first torque control step of operating the first motor generator with the determined reaction torque of the first motor generator after the first torque determination step.

3. The method of claim 2, wherein when an absolute value of a rotation speed of the first motor generator is a predetermined speed or more after the engine torque control step, the first torque determination step is performed.

4. The method of claim 1, further including:
   a second torque determination step of determining a driving torque of the second motor generator based on the driver-requested torque and of determining a reaction torque of the second motor generator based on the target engine torque and the engine speed control torque by a second torque determiner after the engine torque determination step; and
   a second torque control step of operating the second motor generator with a sum of the determined driving torque and the reaction torque of the second motor generator.

5. The method of claim 4, further including a torque intervention determination step of determining a torque intervention value reducing a torque of the second motor generator by a predetermined rate at a shifting time point by a torque intervention control device when shifting is required after the result of performing the shifting request check step,
   wherein, in the second torque determination step, the second torque determiner is configured to determine the driving torque of the second motor generator by summing up the driver-requested torque and the torque intervention value.

6. The method of claim 4, wherein when an absolute value of a rotation speed of the first motor generator is a predetermined speed or more after the engine torque control step, the second torque determination step is performed.

7. The method of claim 1, further including an overdrive control step of operating a brake connected to the first motor generator by an overdrive control device when an absolute value of a rotation speed of the first motor generator is less than a predetermined speed after the engine torque control step.

8. The method of claim 7, further including a third torque determination step of determining a driving torque for the second motor generator based on the driver-requested torque by a second torque determiner after the overdrive control step.

* * * * *